United States Patent [19]

Blanton

[11] Patent Number: 4,529,861
[45] Date of Patent: Jul. 16, 1985

[54] WELDING GUN CONNECTOR ASSEMBLY

[75] Inventor: John E. Blanton, Wichita, Kans.

[73] Assignee: Tweco Products, Inc., Wichita, Kans.

[21] Appl. No.: 597,250

[22] Filed: Apr. 5, 1984

[51] Int. Cl.³ ............................................... B23K 9/32
[52] U.S. Cl. .............................. 219/137.63; 219/137.9
[58] Field of Search ..................... 219/137.31, 137.62, 219/137.63, 137.9

[56] References Cited

U.S. PATENT DOCUMENTS

| | | | |
|---|---|---|---|
| 3,629,547 | 12/1971 | Kester et al. | 219/137.42 X |
| 3,775,584 | 11/1973 | Moerke | 219/130 |
| 3,783,233 | 1/1974 | dal Molin | 219/130 |
| 4,210,796 | 7/1980 | Moerke | 219/137.9 X |
| 4,297,561 | 10/1981 | Townsend et al. | 219/137.63 |

FOREIGN PATENT DOCUMENTS 74430 3/1983 European Pat. Off. ......... 219/137.9

Primary Examiner—Roy N. Envall, Jr.
Assistant Examiner—Catherine M. Sigda
Attorney, Agent, or Firm—Majestic, Gallagher, Parsons & Siebert

[57] ABSTRACT

In a welding gun apparatus, an improved welding gun quick connector assembly in which supply conduits may be quickly and easily connected and disconnected from a connector body. Supply conduits are securely retained by circumferentially overlapping flanges fastened down with a screw threadably adapted to a passage in the connector body. A seal intermediate between supply conduits and connector body is provided to prevent fluid and gas leakage.

8 Claims, 5 Drawing Figures

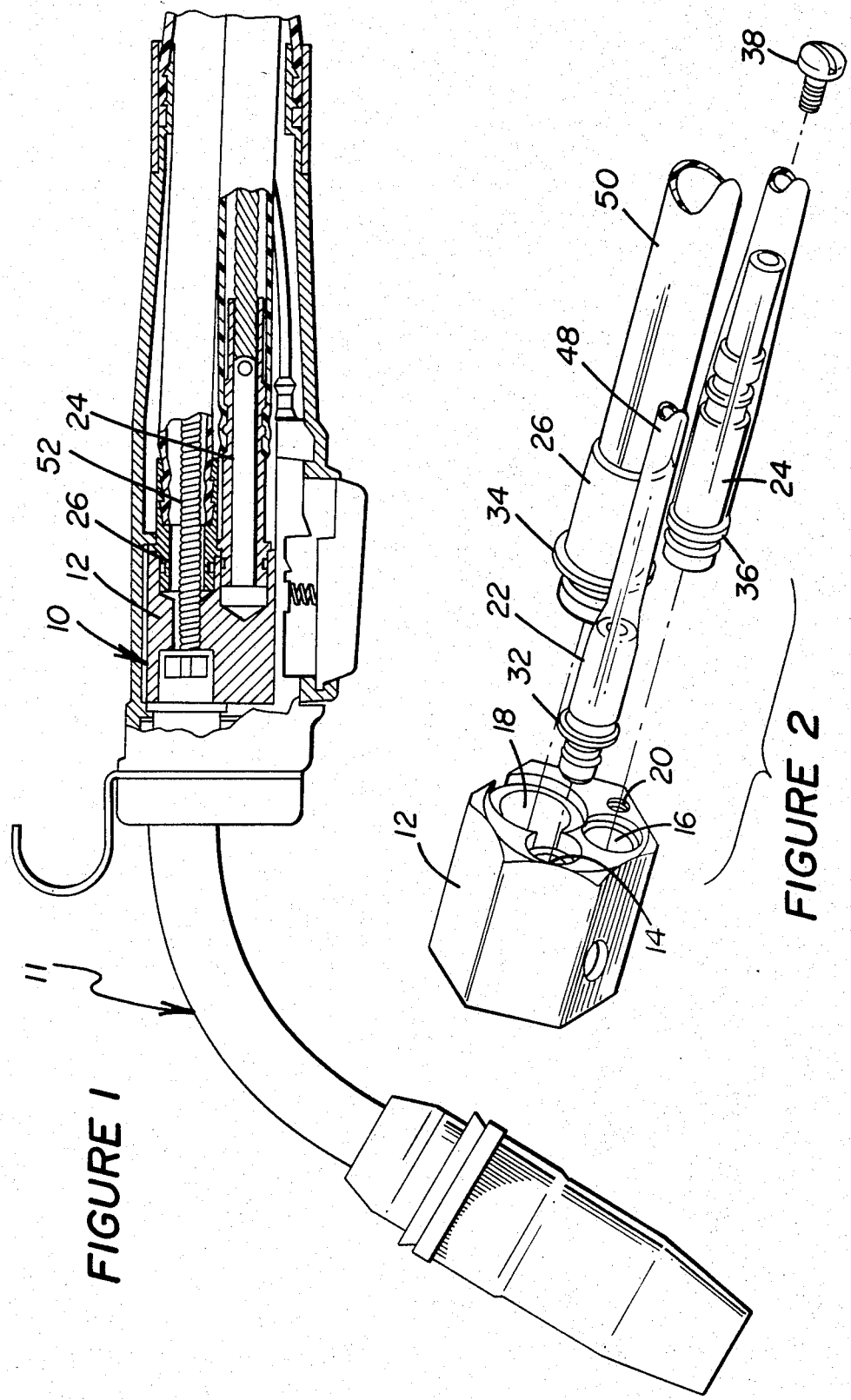

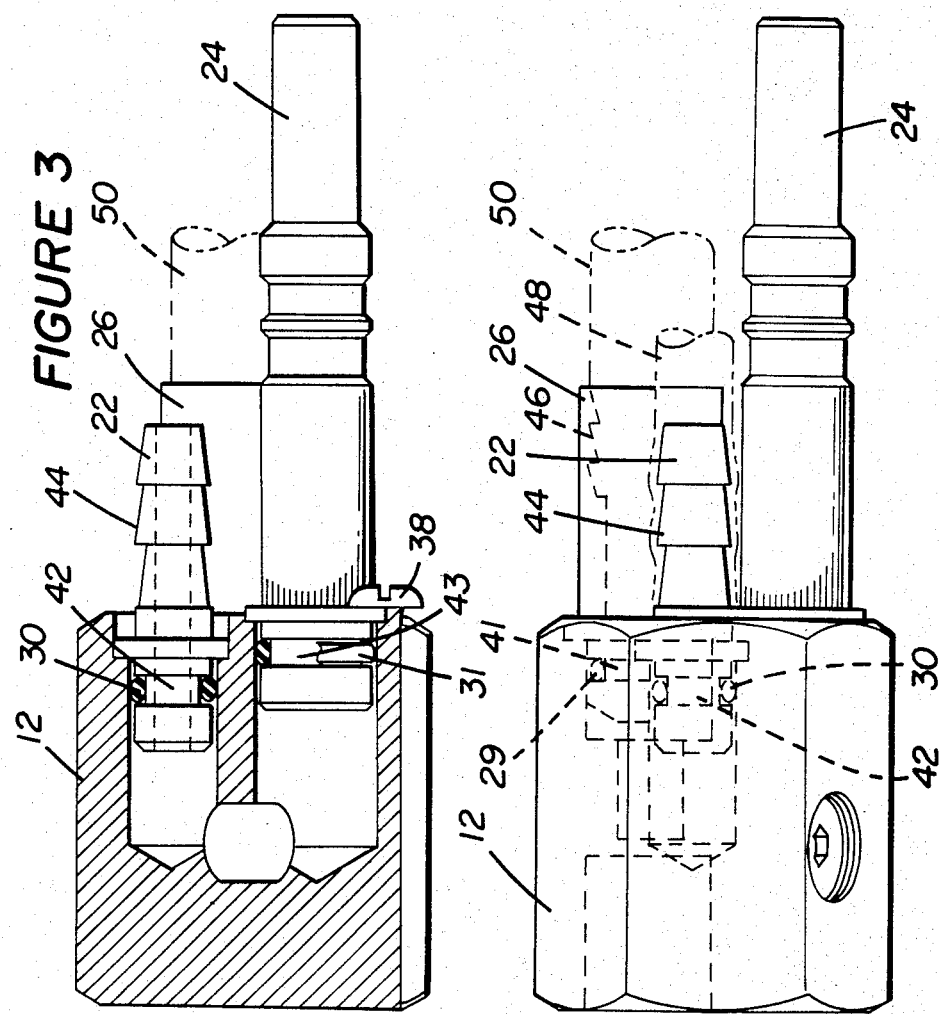

WELDING GUN CONNECTOR ASSEMBLY

BACKGROUND OF THE INVENTION

1. Field of the Invention

This invention relates generally to a welding gun apparatus, and more particularly, relates to an improved connector assembly for a welding gun apparatus.

2. Description of the Prior Art

Welding devices in which a welding wire electrode is supplied to a welding zone through a gun structure are well known in the prior art. These devices normally have a separate supply inlet for an inert shielding gas which is supplied to the welding zone to prevent contamination. A means for transmitting electrical power to the welding tip is also necessary, as is a coolant, which may be circulated throughout the entire assembly.

U.S. Pat. No. 3,629,547 assigned to the same assignee, for example, shows a semiautomatic welding apparatus having a welding gun assembly connected through a cable assembly to a quick connector assembly which, in turn, is adapted to be inserted into a supply adapter assembly operable to be connected to gas, welding wire, and power cable supply sources. U.S. Pat. No. 4,297,561, also assigned to the same assignee, shows a similar apparatus with an imprved handle assembly including a removable, adjustable tube assembly within the welding gun. U.S. Pat. Nos. 3,629,547 and 4,297,561 are entirely incorporated herein by reference, and parts not shown in the drawings herein are illustrated in detail in U.S. Pat. No. 4,297,561.

This invention is directed to an improved quick connector assembly for use in a welding gun apparatus. Prior such connector assemblies necessitated the screwing in of threaded conduit connectors to threaded passages in the connector block. This method proved inconvenient and impractical, as it resulted in the twisting of much of the supply tubing as the conduit connectors were being fastened in to the connector block. Frequent connecting and disconnecting of the connector assembly to the cable connector and supply adapter assemblies also resulted in wearing of the threads in the conduit connectors and in the connector passages, necessitating frequent replacement of parts. Additionally, fluid and gas may seep through worn threads or through a loose connection. This leakage problem may not be alleviated merely by the application of sealant to the threaded connections, as electrical contact between the conduit connectors and the connector block is a necessity. This invention provides an improved, quick-disconnect apparatus for joining the supply conduits to the connector block. The invention significantly reduces the leakage and wear problems while maintaining the necessary electrical contact, and obviates the need for a threaded connection.

SUMMARY OF THE INVENTION

The invention is an apparatus for joining conduit connectors to a connector body in a welding gun apparatus in such a way that the conduits may be securely retained in the connector body, yet may be quickly and easily connected and disconnected.

Accordingly, it is an object of this invention to provide a welding gun connector assembly wherein a locking means securely fastens the supply conduits in a connector body.

It is another object of this invention to provide a welding gun connector assembly wherein the locking means is structured so that supply conduits may be securely fastened within a connector body by means of a fastener and interfering flanges on the conduits.

It is yet another object of this invention to provide a welding gun connector assembly wherein flanges on the supply conduits circumferentially overlap and may be retained by means of a screw theadably adapted to a passage in the connector body.

It is a further òbject of this invention to provide a welding gun connector assembly wherein the connections between the supply conduits and connector body are sealed to prevent leakage.

It is another object of this invention to provide a welding gun connector assembly wherein the connections between the supply conduits and connector body are sealed by means of O-rings adapted to fit the conduit connectors.

It is yet another object of this invention to provide a welding gun connector assembly wherein the conduits are adapted to fit supply tubing.

It is a further object of this invention to provide a welding gun connector assembly wherein the conduits are structured to fit supply tubing by means of a plurality of tapered ridges on the conduit surfaces.

Further objects and advantages of this invention will become apparent from the study of the following portion of the specification, the claims and the attached drawings.

BRIEF DESCRIPTION OF THE DRAWINGS

FIG. 1 is a side view of the gun assembly and a partial sectional view of the improved quick connector assembly;

FIG. 2 is a an exploded view of the improved quick connector assembly and conduit connectors;

FIG. 3 is an enlarged, partial sectional view of the improved quick connector assembly and shows in the foreground details of the water and power conduit connectors;

FIG. 4 is an enlarged, partial sectional view of the improved quick connector assembly shown rotated 60° from the position illustrated in FIG. 3;

FIG. 5 is an elevated, perspective view of the improved quick connector assembly.

DETAILED DESCRIPTION OF THE PREFERRED EMBODIMENT

A preferred embodiment of the improved welding gun connector assembly is shown in FIGS. 1 through 5. FIG. 1 illustrates the improved quick connector assembly 10 positioned in welding gun apparatus 11.

The quick connector assembly 10 is provided with a connector body 12 having a first passage 14 adapted to retain water supply conduit 22. The connector body 12 is additionally provided with a second passage 16 adapted to retain power supply conduit 24 and with a third passage 18 adapted to retain gas supply conduit 26.

When water supply conduit 22, power supply conduit 24 and gas supply conduit 26 are positioned in connector body 12, they are securely locked in by means of circumferentially overlapping flanges 32, 34 and 36 as shown in FIG. 5, thus obviating the need for threaded connections. Also shown in FIG. 5, a screw 38 threadably adapted to a fourth passage 20 in connector body 12 circumferentially overlaps uppermost flange 36 and thereby ensures secure retention of supply conduits 22, 24 and 26, and a structure which may be quickly and simply connected and disconnected.

As may be seen in FIGS. 2 through 4, water supply conduit 22, power supply conduit 24 and gas supply conduit 26 are provided with annular grooves 41, 42 and 43 adapted to fit O-rings 29, 30 and 31, thereby providing a seal against fluid and gas leakage while maintaining the necessary electrical contact between connector body 12 and supply conduits 22, 24 and 26.

Water supply conduit 22 which permits passage of cooling water into gun apparatus 11 includes on its outer surface a plurality of tapered ridges 44 adapted to secure water supply tubing 48. Similarly, gas supply conduit 26 which provides welding wire 52 and shielding gas to welding gun apparatus 11 includes on its inner surface a plurality of tapered notches 46 adapted to secure gas supply tubing 50.

While the invention has been described in conjunction with preferred specific embodiments thereof, it will be understood that this description is intended to illustrate and not limit the scope of the invention which is defined by the following claims.

I claim:

1. An improved welding gun connector assembly comprising a body, a plurality of passages, and a plurality of supply conduits for admitting coolant and gas, wherein the improvement comprises a locking means on said conduits and said body, said locking means comprising a plurality of flanges on said conduits, said flanges including an uppermost flange spaced away from said body and cooperable with a fastening means on said body, whereby said conduits may be attached to said body and quickly detached therefrom.

2. The apparatus of claim 1, wherein said flanges and said passages are positioned in said body so that said flanges interfere with one another when said conduits are positioned in said passages.

3. The apparatus of claim 2, wherein said fastening means and said flanges circumferentially overlap so that retention of said uppermost flange by said fastening means causes retention of all said conduits in said body.

4. The apparatus of claim 3, wherein said fastening means is a screw threadably adapted to one of said passages in said body.

5. The apparatus of claim 1, further including a seal means intermediate between said conduits and said passages.

6. The apparatus of claim 5, wherein said seal means is an O-ring adapted to fit each said conduit.

7. The apparatus of claim 1, further including a means for securing supply tubing onto said conduits.

8. The apparatus of claim 7, wherein said securing means comprises a plurality of tapered ridges on the surface of said conduits.

* * * * *